Nov. 21, 1967    H. W. DIETERT    3,353,873
VALVE STRUCTURE FOR BULK MATERIALS
Filed July 11, 1966    2 Sheets-Sheet 1
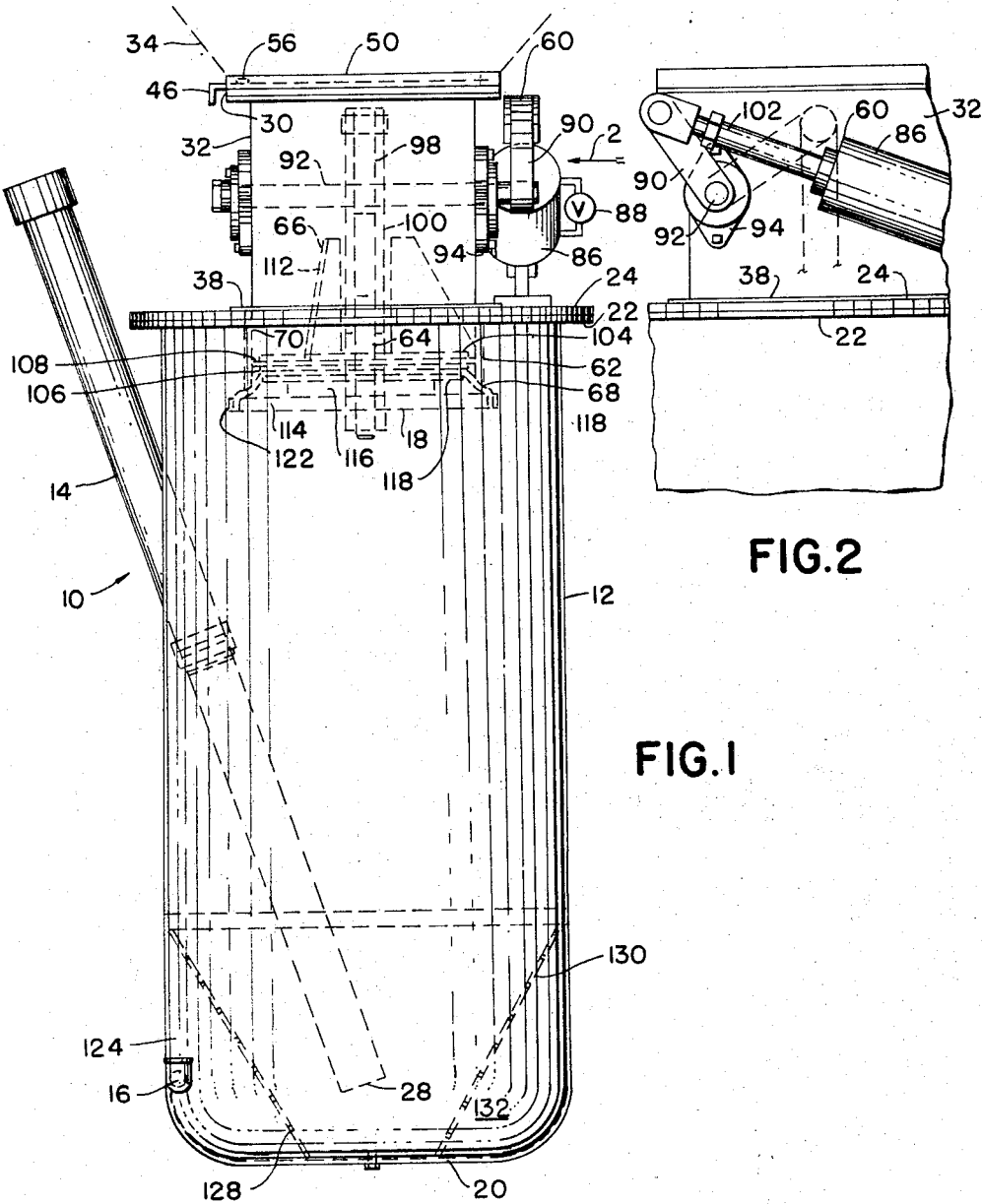

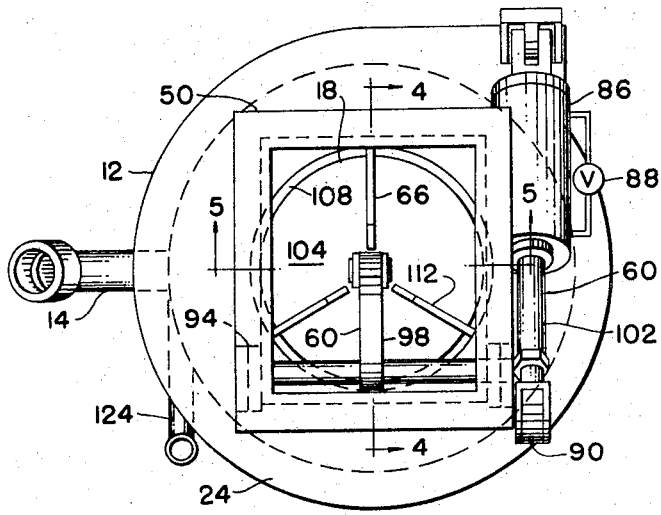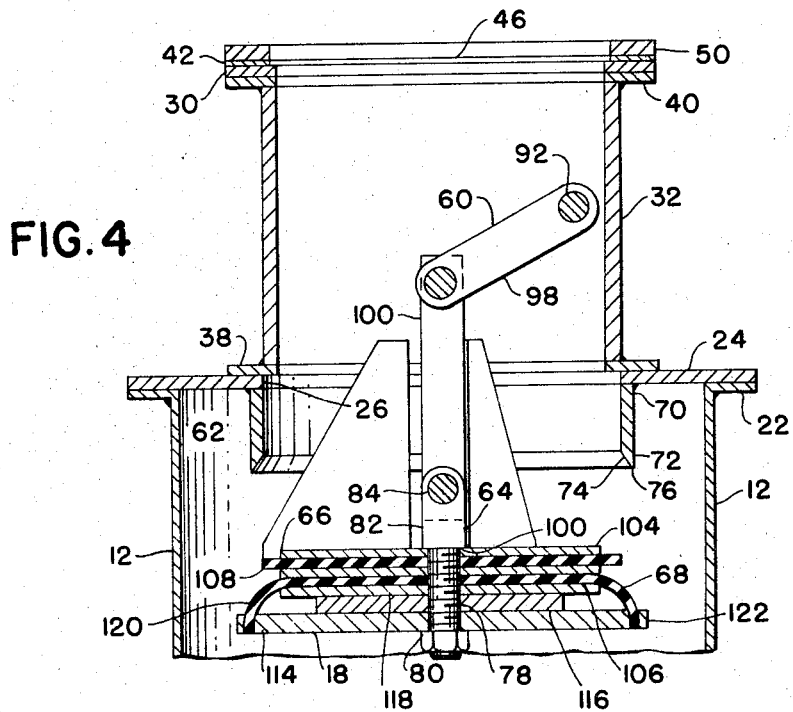

United States Patent Office 3,353,873
Patented Nov. 21, 1967

3,353,873
VALVE STRUCTURE FOR BULK MATERIALS
Harry W. Dietert, Kerrville, Tex., assignor to Harry W. Dietert Co., Detroit, Mich., a corporation of Michigan
Filed July 11, 1966, Ser. No. 564,407
8 Claims. (Cl. 302—53)

ABSTRACT OF THE DISCLOSURE

Bulk material transporting structure, including a tank, a discharge conduit connected to said tank, valve means through which powdered material is positioned in the tank, including separate wiping and sealing portions for separately contacting a valve seat in sequence to first wipe the valve seat and then seal the valve seat, guide structure for guiding the valve means into contact with the valve seat and actuating means for the valve.

---

In the past bulk material, such as powdered additives for granular material as for example bonding agent for foundry sand or the like, has usually been transported in sacks from a storage place to the point of use. The sacks have then been emptied by hand. This procedure is time consuming, tiresome and dirty.

Where automatic means for transferring bulk materials, such as conduit through which fluidized powdered material is passed by means of air pressure have been used in the past, the systems have often been inefficient due to their inability to operate against the necessary head of powdered material. The failure of such systems has generally been due to the inadequacy of the valve for sealing the pressure tank from which the powdered material is blown from the storage bin or other source of powdered material.

It is therefore one of the purposes of the present invention to provide improved apparatus for transporting bulk materials.

Another object is to provide bulk material transfer apparatus including a transfer tank, an outlet conduit, means for pressurizing the transfer tank and valve structure for said transfer tank between the tank and the bulk material to be transferred, including improved means for closing the valve, centering and aligning the valve and for wiping and sealing the valve.

Another object is to provide bulk material transfer structure as set forth above wherein the improved centering and aligning means comprises a plurality of angularly spaced apart tapered fins and a rubber disc secured between two circular metal plates attached to a valve shaft.

Another object is to provide bulk material transfer structure as set forth above wherein the wiping and sealing means includes a circular metal seat extending radially outwardly of a cylindrical sleeve having a tapered valve surface at one end thereof, a circular spacing member positioned on said metal seat, and an annular rubber riping and sealing member, the inner periphery of which is secured to the top of the spacing member and the outer periphery of which extends over the outer periphery of the metal seat and means for securing the metal seat and spacing member to a valve shaft axially thereof.

Another object of the invention is to provide an improved valve structure for sealing bulk material transfer apparatus or the like and including improved centering and aligning means and improved wiping and sealing means.

Another object is to provide improved bulk material transfer apparatus and valve structure as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a diagrammatic, elevation view of bulk material transfer apparatus including valve structure constructed in accordance with the invention.

FIGURE 2 is a partial side view of the bulk material transfer apparatus illustrated in FIGURE 1 taken in the direction of arrow 2 in FIGURE 1.

FIGURE 3 is a top view of the bulk material transfer apparatus illustrated in FIGURE 1 with the gate removed.

FIGURE 4 is an enlarged, partial section view of the bulk material transfer apparatus illustrated in FIGURE 1 taken substantially on the line 4—4 in FIGURE 1.

FIGURE 5 is an enlarged, partial section view of the bulk material transfer apparatus illustrated in FIGURE 1 taken substantially on the line 5—5 in FIGURE 3 and showing the gate in place.

With particular reference to the figures of the drawing, one embodiment of the present invention will now be described in detail.

As shows best in FIGURE 1, the bulk material transfer apparatus 10 includes the transfer tank 12 having the discharge conduit 14 therein, means 16 for pressurizing the transfer tank 12, and the valve structure 18 for sealing the transfer tank 12 when the tank is pressurized and for permitting powdered material to pass therethrough into the tank 12 when the tank is unpressurized.

In operation, with the valve structure 18 open, powdered material is passed through the valve 18 into the tank 12. The valve 18 is then closed and the tank is pressurized by the pressurizing means 16 so that the powdered material in the tank 12 is fluidized and passed out of the discharge conduit 14.

More specifically the transfer tank 12 is cylindrical in cross section, as best shown in FIGURE 3, and has a dish-shaped bottom 20, as illustrated best in FIGURE 1. A radial flange 22 is provided at the top of the transfer tank 12 and a tank cover or coupler plate 24 having an annular opening 26 therein is secured to the tank 12 by convenient means, such as bolts.

The discharge conduit 14 extends at an angle through the side of the transfer tank 12 and terminates with an open end 28 adjacent the bottom 20 of the tank 12. Thus, when the tank 12 is pressurized and powdered material therein is fluidized, it will be forced into the end 28 of the discharge conduit 14 to be transferred through the conduit 14 to a desired location. The coupler plate 24 is bolted to the flange 22 on the top of the tank 12 and supports the transition housing 32 positioned between the coupler plate 24 and a storage bin for powdered material, such as bonding agent for foundry sand 34. The transition housing 32 is secured over the opening 26 in the coupler plate 24.

The top of the housing 32 which is rectangular in cross section is provided with an outwardly extending flange 40. A rectangular spacing member 30 is positioned on the flange 40 on which a U-shaped guide member 42 is positioned extending on three sides thereof. The U-shaped member 42 has the same external periphery as the corresponding three sides of the spacing member 30 but is of lesser width than the spacing member 30 to provide a ledge 44 on three sides of the flange 40 for guiding the flat gate 46 in opening and closing movement in the direction of arrows 48 to open and close the passage between the storage bin 34 and tank 12 through the transition housing 32.

The bin 34 is provided with a lower flange 50 which sets on top of the guide member 42 and which is provided with a recess 52 in one side thereof over the open side of the U-shaped member 42. A filler member 54 is positioned in the recess 52 having the felt insert 56 therein for wiping the powdered material from the gate 46 as it is withdrawn from over the top of the transition housing 32.

On reinserting of the gate 46 to close the top of the housing 32, the bevelled edge 58 of the gate 46 is useful in providing easy operation of the gate 46 and preventing packed powdered material from preventing full closing of the gate 46. The flange 40 of the transition housing, the spacing member 30, the U-shaped member 42, and flange 50 of the bin 34 are secured together by convenient means, such as bolts.

The valve structure 18 includes the cylindrical valve seat sleeve 62 and the valve shaft 64. Actuating mechanism 60 is provided for moving the valve shaft 64 vertically into and out of a vale seating position, and centering and aligning means 66 and wiping and sealing means 68 for the valve structure 18 are secured to the valve shaft 64.

The cylindrical valve seat sleeve 62 is welded at the upper end 70 around the opening 26 in the coupler plate 24 and is provided at the lower end 72 with a bevelled surface 74 terminating in a flat annular end sealing surface 76. Valve shaft 64 has a reduced diameter lower end 78 which is threaded to receive a locking bolt 80. The upper end 82 is adapted to receive a pivot pin 84 extending therethrough by which the shaft 64 is connected to the actuating mechanism 60.

The actuating mechanism 60 for the valve structure 18 includes a piston and cylinder hydraulic motor 86 which may be actuated by convenient valve means 88 either manually or automatically as desired connected to rotate lever 90 about the axis of rotation of the shaft 92 which is journalled for rotation in bearings 94 set in the transition housing 32. Lever 90 is pivotally connected to the motor 86 by pivot means at one end thereof and is rigidly connected to the shaft 92 at the other end thereof. The actuating mechanism 60 further includes the lever 98 rigidly secured to the shaft 92 at one end and pivotally secured to the links 100 as the other end. The links 100, as shown best in FIGURE 4, are connected to the upper end of shaft 64 by the pivot pin 84, as previously indicated.

In operation, with the valve structure 18 in the open position as shown in FIGURE 4, the motor means 86 is energized through valve 88 to extend the piston rod 102 whereby the lever 90 is pivoted clockwise, the shaft 92 is rotated clockwise, and the lever 98 is rotated clockwise in FIGURE 4. The links 100 thus cause the shaft 64 to be raised vertically to bring the valve structure 18 into a closed position, as shown best in FIGURE 1. Retraction of the piston rod 102 will in a similar manner produce a downward movement of the shaft 64 to again open the valve structure 18, as shown in FIGURE 1.

The centering and aligning means 66 of the valve structure 18, as shown in FIGURES 1, 3 and 4, includes a pair of circular metal plates 104 and 106 and a circular rubber disc 108 sandwiched therebetween, all of which are axially sleeved over the shaft 78 and held tightly against the abutment 110 thereon formed by the variable diameters thereof. The centering and aligning means 66 further includes the angularly spaced apart axially extending tapered metal guide fins 112 secured to the metal plate 104 by convenient means, such as welding, and having a bottom portion extending substantially to the outer radius of the rubber disc 108.

Thus, in use, as the shaft 64 of the valve structure 18 is drawn upward, the guiding fins 66 engage the inner surface of the valve seat sleeve 62 to center the shaft 64 in the opening provided by the sleeve 62. As the centered shaft 64 moves upwardly it is aligned in its centered position by the rubber disc 108 engaging the inner surface of the valve seat sleeve 62.

The wiping and sealing means 68 of the valve structure 18 includes the circular metal seat 114, the spacer 116, metal plate 118 and circular rubber wiping and sealing member 120 held in position between the plate 106 and plate 118 about an inner diameter thereof and the outer diameter of which is secured by the securing ring 122 to the outer periphery of the metal seat 114.

The rubber wiping and sealing member 120, as shown in FIGURE 1, while pliable is stiff enough to maintain the indicated configuration with the valve structure 18 in the open position. When the valve structure 18 is closed, the rubber wiping and sealing member 120 first wipes the sealing surface 76 and tapered surface 74 of the valve seat sleeve 62 and then forms a seal therewith on the portion thereof clamped between the metal seat 114 and the surface 76 with the valve structure 18 in a completely closed position. Thus, a complete seal is assured with the valve structure 18 even with a high pressure in the tank 12.

In overall operation of the bulk material transfer apparatus 10, with the valve structure 18 open, as in FIGURE 4, the gate 46 is pulled out to allow powdered material from the storage bin 34 to pass through the transfer housing 32 into the transfer tank 12 through the valve 18. The gate 46 is closed after a desired amount of powdered material is passed into the transfer tank 12. Motor 86 is actuated to raise the valve shaft 64 through the actuating mechanism 60 with the shaft 64 being centered and aligned in position within the valve seat sleeve 62 by the centering and aligning means 66. The valve seat provided by the valve seat sleeve 62 is first wiped and then sealed by the wiping and sealing means 68 of the valve structure 18 to provide a clean, tight seal on upward movement of the shaft 64.

The powdered material in the transfer tank is then fluidized by means of air passed through the conduit 124 of the pressurizing means 16 into the transfer tank 12 and through the openings 128 in the funnel-shaped filter 130 which prevents the powdered material from passing into the plenum chamber 132 but does not prevent air under pressure from passing through the filter 130 into the tank 12. The fluidized powdered material is then forced up the discharge conduit 14 through the end 28 thereof from which it is passed to a desired location.

After the powdered material in the tank 12 has been transferred to the desired location the pressure in tank 12 is removed and the motor means 86 is actuated in the opposite direction to open the valve structure 18 to complete a cycle of operation of the bulk material transfer apparatus 10.

While one embodiment of the present invention has been disclosed in detail, it will be understood that other embodiments and modifications thereof are contemplated. It is the intention to include all embodiments and modifications as are defined by the appended claims within the scope of the invention.

What I claim as my invention is:

1. Bulk material transporting structure comprising a tank for collecting powdered material, a discharge conduit connected to said tank, means for pressurizing said tank and valve means through which powdered material may pass into said tank and for sealing said tank except for the discharge conduit and the pressurizing means including a vertically movable shaft, actuating mechanism for moving said shaft vertically, centering and aligning means secured to said shaft for positioning the shaft on closing of the valve, including a valve seat sleeve and a plurality of angularly spaced apart tapered camming members secured to and extending axially of the vertically movable shaft within said sleeve, a pair of rigid circular members, a resilient disc sandwiched between the rigid members and extending radially outwardly therefrom, means for securing the rigid members and disc to one end of the vertically movable shaft coaxially therewith, and wiping and sealing means also secured to said shaft for wiping and sealing the valve on closing of the valve.

2. Structure as set forth in claim 1 wherein the wiping and sealing structure comprises a bevelled lower edge on said sleeve, a circular rigid abutment member extending radially outwardly beyond the outer diameter of the sleeve, a circular rigid spacing member positioned on said circular abutment member, a circular rigid member positioned on said spacing member, and an annular resilient wiping and sealing member, the inner periphery of which is secured between the rigid member on the spacing member and one of said rigid members of the centering and aligning means and the outer periphery which is secured over the outer periphery of the rigid abutment member, and means for securing the rigid member on the spacing member, the spacing member and abutment member to the other end of said shaft over the centering and aligning means and coaxially therewith whereby on upward movement of the shaft the lower end of the valve seat sleeve is first wiped by said wiping and sealing member and the wiping and sealing member is then pinched between the lower edge of said sleeve and said abutment member to seal the valve.

3. Valve structure for selectively sealing an opening comprising a vertically movable shaft, actuating mechanism for moving said shaft vertically, centering and aligning means secured to said shaft for positioning the shaft in said opening on closing of the valve, including a valve seat sleeve and a plurality of angularly spaced apart tapered camming members secured to and extending axially of the vertically movable shaft within said sleeve and further including a pair of rigid circular members, a resilient disc sandwiched between the rigid members and extending radially outwardly therefrom, means for securing the rigid members and disc to one end of the vertically movable shaft coaxially therewith, and wiping and sealing means also secured to said shaft for wiping and sealing the valve on closing of the valve.

4. Structure as set forth in claim 3 wherein the wiping and sealing structure comprises a bevelled lower edge on said sleeve, a circular rigid abutment member extending radially outwardly beyond the outer diameter of the sleeve, a circular rigid spacing member positioned on said circular abutment member, a circular rigid member positioned on said spacing member and an annular resilient wiping and sealing member, the inner periphery of which is secured between the rigid member on the spacing member and one of said rigid members of the centering and aligning means and the outer periphery which is secured over the outer periphery of the rigid abutment member, and means for securing the rigid member on the spacing member, the spacing member and abutment member to the other end of said shaft over the centering and aligning means and coaxially therewith whereby on upward movement of the shaft the lower end of the valve seat sleeve is first wiped by said wiping and sealing member and the wiping and sealing member is then pinched between the lower edge of said sleeve and said abutment member to seal the valve.

5. Valve structure for selectively sealing an opening comprising a vertically movable shaft, actuating mechanism for moving said shaft vertically, a valve seat having a bevelled lower edge and wiping and sealing structure for said valve, including a circular rigid abutment member extending radially outwardly beyond the outer diameter of the sleeve, a circular rigid spacing member positioned on said circular abutment member, a circular rigid member positioned on said spacing member, and an annular resilient wiping and sealing member, the inner periphery of which is secured over the rigid member on the spacing member, and the outer periphery of which is secured over the outer periphery of the rigid abutment member, and means for securing the rigid member on the spacing member, the spacing member and abutment member to one end of the shaft, whereby on upward movement of the shaft the lower end of the valve seat sleeve is first wiped by the wiping and sealing member, and the wiping and sealing member is then pinched between the lower edge of said sleeve and said abutment member to seal the valve.

6. Structure as set forth in claim 5 and further including centering and aligning means secured to said shaft for positioning the shaft in said opening on closing of the valve.

7. Structure as set forth in claim 6, wherein the centering and aligning means includes a plurality of angularly spaced apart camming members secured to and extending axially of the vertically movable shaft within said sleeve.

8. Structure as set forth in claim 7, wherein the centering and aligning means still further includes a second rigid circular member, a resilient disc sandwiched between the rigid members and extending radially outwardly therefrom, and means for securing the second rigid member and disc to the one end of the vertically movable shaft with the disc in engagement with the rigid member on the spacing member.

References Cited
UNITED STATES PATENTS

| | | | |
|---|---|---|---|
| 1,073,876 | 9/1913 | Steedman | 302—55 |
| 1,935,843 | 11/1933 | Goebels | 302—53 |
| 2,341,018 | 2/1944 | Clapp | 137—244 |
| 2,710,121 | 6/1955 | Rees | 137—244 |
| 3,099,498 | 7/1963 | Jahn | 302—53 |

ANDRES H. NIELSEN, *Primary Examiner.*